Figure 1:
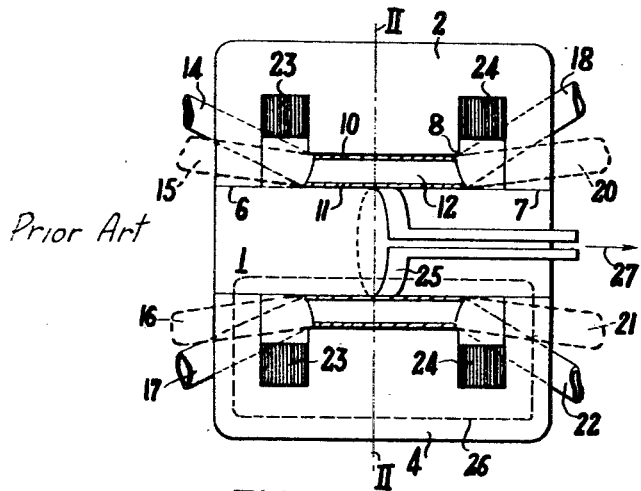

Nov. 28, 1967 P. LEROND 3,355,606

MAGNETO-HYDRODYNAMIC GENERATOR

Filed Feb. 3, 1964

3,355,606
MAGNETO-HYDRODYNAMIC GENERATOR
Pierre Lerond, Epinay-sur-Orge, France, assignor to Commissariat à l'Energie Atomique, Paris, France
Filed Feb. 3, 1964, Ser. No. 341,936
Claims priority, application France, Feb. 14, 1963, 924,818
1 Claim. (Cl. 310—11)

The present invention relates to a type of device of comparatively recent design which directly transforms thermal energy into electrical energy and is commonly known as a "magneto-hydrodynamic generator."

The principle of operation of generators producing electrical energy in continuous form is simple. Fuel (powdered carbon, kerosene, etc.) is placed inside a combustion chamber with a combustion-assisting means (air rich in oxygen) to produce a very hot, fast flame which penetrates into a specially adapted conduit. This latter has in general an extended flat section and is traversed by a large continuous magnetic field parallel in direction to the minor dimensions of the section of the said conduit. An electric field, perpendicular in direction to the gas flow and to the magnetic field, then appears. A Laplace electromotive force can then be collected between the electrodes disposed along the small sides of the conduit. A direct current passes through a receiving device connected to the electrodes, thermal energy thus being directly transformed into electrical energy. Although the burnt gases have a high temperature of between 2000° K. and 3000° K. for example, their conductivity would be too small if potassium or more preferably caesium, the ionisation potentials of which are very low, were not added to the flame.

Up to now, it has been impossible for this type of generator to be developed industrially. The technological problems raised in building apparatus of these kinds are indeed especially difficult to solve. Their various elements, in particular their electrodes, must fulfil certain very exacting and often contradictory conditions.

Generators producing alternating electrical energy have also been produced. In a device of this type the electromagnet providing the continuous energising magnetic field is replaced by a stator set up as an "asynchronous" generator. Thus from the three-phase input current, there is produced a magnetic field of constant magnitude which moves along the conduit at an equally constant speed. It can therefore be said that the device in question is itself an asynchronous generator since it assimilates the conductive layer constituted by the gas passing through the conduit to the developed rotor, of the squirrel cage type, of a machine of this type.

A generator of this type has the advantage of not having any electrodes. Unfortunately their building still presents great difficulties. In the conduit, the gas has a speed of between 500 metres/sec. and 1000 metres/sec. and the production of an electric current of the industrial frequency of 50 c./s. necessitates the provision of two poles of opposite polarity separated prohibitively from one another (5 or 10 metres apart). It is, then, impossible to prevent the considerable cooling of the gases in a conduit of such length. The internal resistance of such a generator is similarly too great as a result of the length of the current circuits in the gas.

AC generators are known which are of a more simple type than those known as asynchronous. The process of conversion of energy effected in these generators consists in creating in the conductive gas, circuits of alternating current, the energy of which is transferred by magnetic induction to an output coil independent of the field coil.

A generator of this type will be described clearly later but it should be mentioned here that the form of the duct in which the hot gases circulate is complicated by the fact that it must have a ring-shaped cross-section in that part which passes through the magnetic circuit, which is of an equally complex form, and which carries the field (or energising) and output coils.

The present invention has for an object a magneto-hydrodynamic AC generator which does not have the disadvantages referred to above.

The invention consists in a magneto-hydrodynamic generator in which a fluid at high temperature and rendered highly conductive passes through a magnetic circuit in which it is subjected to an alernating energising magnetic field, wherein said fluid circulates in at least two successive conduits located between the poles of the same number of electro-magnets supplied with alternating current, the input currents of said two successive electro-magnets being of opposite phase, each conduit, excepting the last, dividing upon leaving the air gap of the electro-magnet, between the poles of which it is located, into two tubes which pass on either side of a magnetic core and which recombine to form the following conduit, and power take off means being connected to each of said cores.

A yoke connected to each magnetic core may support the coils, at the ends of which the components of the voltage produced appear.

Figure 3:
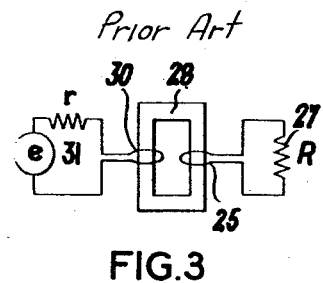
Figure 4:
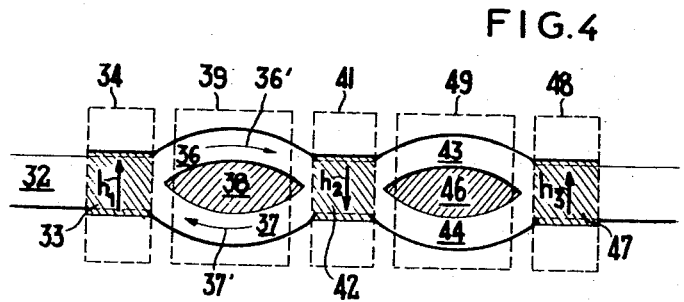
Figure 2:
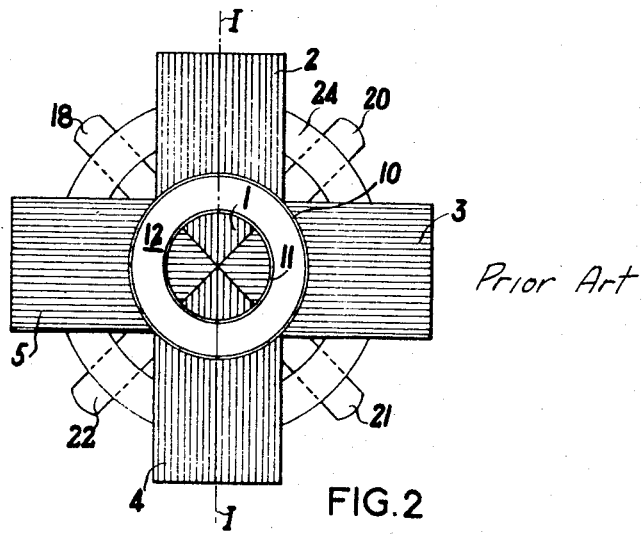

In order that the invention may be more clearly understood, reference will now be made to the accompanying drawings which show a generator of a known kind for comparison with a generator according to the invention, and in which:

FIGURES 1 and 2 show sectional views of two perpendicular planes of a generator according to the prior art, FIGURE 3 shows an equivalent electrical diagram corresponding to the generator of FIGURES 1 and 2, and FIGURE 4 is the electrical diagram of a generator according to the invention.

Referring to the drawings, FIGURES 1, 2 and 3 relate to a generator of a known type, having a symmetry of the fourth order about a horizontal axis (see particularly FIGURES 1 and 2).

The generator comprises a cylindrical core 1 made up of magnetic laminations and four magnetic circuits 2, 3, 4 and 5 radially and symetrically disposed along two perpendicular axes about said core. Each of these circuits has two lateral arms such as 6 and 7 resting upon the ends of the core 1, without air gap, a central pole such as 8 having, by contrast, an annular air gap about said core.

Two tubes 10 and 11 of insulating refractory material limit, within the air gap, an annular conversion chamber or conduit 12. The pipes 14, 15, 16 and 17 allow the introduction of a hot conductive gas and the pipes 18, 20, 21 and 22 allow the gas to escape.

In order to make the structure of the generator more easily understood, pipes 15, 16, 20 and 21 have been shown in FIGURE 1 by dotted lines, although they are in fact located in the part of the generator in front of the sectional plane, that is, actually invisible on the drawing. All these pipes should be brought into line with the annular channel in spite of arms such as 6 and 7 of the magnetic circuit which constitute the radial yokes. The shape and dimensions of these tubes are calculated to reduce as far as possible losses of energy in the fluid which must pass through them although the diagrammatic character of FIGURES 1 and 2 do not actually permit this to be seen.

Two energising coils 23 and 24 are located in cavities of the magnetic circuit and surround the core 1. They are connected to the input source of alternating voltage (mains) in such a way that the alternating radial fields which they then create in the conversion chamber 12 are of the same sense.

The generator power take-off coil with which is connected a loading or charging device of low impedance is a single turn 25 wound about the core 1. It should be noted that said turn may be substituted by a coil having any number of turns dependent upon the impedance of the load.

The operation of the generator will now be described.

When the fluid at high temperature and rendered conductive is sent into the conversion chamber or conduit via pipes 14, 15, 16 and 17, the paths of its molecules are parallel to the axis of the core 1.

In an imaginary turn located in the gas coaxially surrounding the core 1 an electric field is established according to Laplace's theorem:

$$h = Bv \sin wt$$

and the voltage appearing in the cut turn is $$e = Bvl \sin wt$$

where: B is the inductance in the air gap, $v$ is the velocity of the gas, $l$ is the length of the turn $w$ is the pulse of the energising magnetic field, the voltage $e$ being in phase with the energising flux.

Provided that the voltage $e$ is sufficiently great, a cylindrical sleeve of current will be formed, the cross section of which is that of the conversion chamber or conduit 12 and the length that of the pole 8.

This sleeve of current itself creates an alternating magnetic flux, the lines of force of which run along the dotted line 26 (FIGURE 1) and pass through the turn 25 without passing via the pole 8. The strength of this current is greatly limited by the impedance due to the gap-less magnetic circuit which passes through it. It is similarly limited when the primary winding of the transformer is energised while the secondary coil is disconnected.

If a load 27 is connected to the single turn 25, the generator provides the latter with alternating current. In the particularly simple case where it can be supposed that the transformer thus formed is perfect, the primary and secondary windings being reduced to one turn, FIGURE 3 gives the circuit diagram equivalent to the generator. The rectangular ring 28 represents the magnetic circuit of the generator, 30 represents the current in the form of a sleeve functioning as primary winding, 25 and 27 are the turn of the secondary winding and the load respectively. The turn 30 is connected to a voltage source $e$ already defined by means of a resistance 31 ($r$) which is that of the primary winding and the turn 25 is connected to the load 27 of resistance R. If the two resistances are of equal value, the power provided will have a maximum value:

$$W = \frac{(Bvl)^2}{4R}$$

The design of a generator of this type sets problems which are difficult to resolve in relation to the input and output of the conversion chamber or the conduit with hot conductive fluid. The shapes of pipe 14, 15, 16, 17, 18, 20, 21 and 22 must result in fact in a difficult compromise between obtaining a maximum yield and facilitating construction.

The generator according to the invention which is illustrated by FIGURE 4 operates in the same manner as the generator which has just been described, but as it has no sinuous gas circuit, its construction is simpler.

The generator according to FIGURE 4 is an embodiment of the invention.

Here the conduit 32 conveying the hot conductive fluid is extended by a conduit 33 located between the poles of an electro-magnet 34 energised by single-phase alternating current. There then appears, transversely to the tube, an electrical field $h_1$ giving rise to a Laplace voltage E, in the region adjacent to the electro-magnet 34. After leaving the air gap of the latter the conduit 33 divides into two tubes 36 and 37 which pass on either side of a magnetic core 38, said core having an approximately elliptical cross-section. A yoke indicated in the drawing by the rectangle 39 completes the magnetic circuit of which the core 38 forms part, and carries a power take-off coil connected to an external load.

The tubes 36 and 37 recombine at a distance from the core 38 in order to form a conduit 42 and pass between the poles of a second electro-magnet 41 similar to the electro-magnet 34 but energised in opposite phase in such a way that the electric field $h_2$ created is of opposite polarity to the field $h_1$ as is the corresponding Laplace voltage.

The gas conduit again divides into two tubes 43 and 44 in order to pass on either side of a core 46, similar to the core 38. The two tubes 43 and 44 recombine to form a third conduit 47 and pass between the poles of an electromagnet 48, the input current of which is in phase with that of the electro-magnet 34.

It has already been explained that in the tubes on the right of the electro-magnet 34, there appears a Laplace voltage corresponding to the field $h_1$.

A Laplace voltage of opposite polarity simultaneously appears at 41 and a Laplace voltage of the same polarity as that corresponding to the field $h_1$ of the electro magnet 34 appears at 48.

Consequently, a ring of current is formed about the core 38, said current circulating in the direction of the arrows 36' and 37', which constitutes the primary winding connected to the magnetic circuit 38 and 39. The first section (34, 38 and 39, 41) of the generator then provides energy in an alternating form when the output winding is connected to an external load. The same is true for the second section of the generator (41, 46 plus yoke 49, 48).

The apparatus described, which is normally a generator, may similarly be used as a reversible machine, i.e., it may in certain circumstances impart mechanical energy to the hot conductive fluid instead of producing energy in an electrical form. It then constitutes an electro-magnetic fluid pump.

This machine may be provided with "separate energisation" or the energising windings may be directly connected to the mains. In other words, auto-excitation may be used; the field coil must then be connected to a capacitor in order to constitute an oscillatory circuit, said field circuit being connected to the output winding.

The frequency at which the device according to the present invention operates is of course not necessarily that of the mains.

I claim:

A magneto-hydrodynamic generator employing a high temperature highly conductive fluid passing through a magnetic circuit and subjected to an alternating energising magnetic field, comprising at least two successive conduits in which said fluid circulates, poles for the same number of electro-magnets supplied with alternating current, said succesive conduits being located between said poles, the input currents of successive ones of said electro-magnets being of opposite phase; each of said conduits but the last of said conduits, dividing upon leaving the air gap of the respective one of said electro-magnets into two tubes, said two tubes passing on either side of a magnetic core and then recombining to form the following one of said conduits and power take off means connected to each of said cores.

No references cited.

DAVID X. SLINEY, *Primary Examiner.*